US009722802B2

(12) United States Patent
Jin et al.

(10) Patent No.: US 9,722,802 B2
(45) Date of Patent: Aug. 1, 2017

(54) METHOD, APPARATUS, AND SYSTEM FOR INCREASING NETWORK SECURITY

(71) Applicant: HUAWEI TECHNOLOGIES CO., LTD., Shenzhen (CN)

(72) Inventors: Wenjun Jin, Shanghai (CN); Ying Xiong, Shanghai (CN); Jiajia Chen, Shanghai (CN); Jiangsheng Wang, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 57 days.

(21) Appl. No.: 14/804,643

(22) Filed: Jul. 21, 2015

(65) Prior Publication Data

US 2015/0326401 A1 Nov. 12, 2015

Related U.S. Application Data

(63) Continuation of application No. PCT/CN2013/070785, filed on Jan. 21, 2013.

(51) Int. Cl.
*H04L 9/32* (2006.01)
*H04L 29/06* (2006.01)

(52) U.S. Cl.
CPC ........ *H04L 9/3268* (2013.01); *H04L 63/0823* (2013.01); *H04L 63/123* (2013.01)

(58) Field of Classification Search
USPC ....................................................... 713/158
See application file for complete search history.

(56) References Cited

U.S. PATENT DOCUMENTS 6,671,804 B1  12/2003  Kent
7,653,810 B2   1/2010  Thornton et al.
(Continued)

FOREIGN PATENT DOCUMENTS

CN   101031925   9/2007
CN   101645889   2/2010
(Continued)

OTHER PUBLICATIONS

International Search Report mailed Oct. 31, 2013, in corresponding International Application PCT/CN2013/070785.
(Continued)

*Primary Examiner* — Anthony Brown
*Assistant Examiner* — Samuel Ambaye
(74) *Attorney, Agent, or Firm* — Oblon, McClelland, Maier & Neustadt, L.L.P.

(57) ABSTRACT

Embodiments of the present invention disclose a method, an apparatus, and a system for increasing network security. The method for increasing network security includes: receiving, by a network management system, a certificate message reported by a network element; generating, by the network management system, a first list; when determining that a certificate corresponding to certificate information in the first list needs to be revoked, generating, by the network management system, a certificate revocation request file according to the certificate information, and removing the certificate information in the first list from the first list; and sending, by the network management system, the certificate revocation request file to a public key infrastructure (PKI) system.

17 Claims, 8 Drawing Sheets

(56) References Cited

U.S. PATENT DOCUMENTS

| | | | |
|---|---|---|---|
| 2004/0068650 A1 | 4/2004 | Resnitzky et al. | |
| 2005/0144437 A1 | 6/2005 | Ransom et al. | |
| 2005/0228998 A1* | 10/2005 | Chan | H04L 9/3268 713/175 |
| 2007/0199049 A1* | 8/2007 | Ziebell | H04L 63/10 726/3 |

FOREIGN PATENT DOCUMENTS

| | | |
|---|---|---|
| CN | 102281288 | 12/2011 |
| CN | 102447705 | 5/2012 |
| CN | 102868709 | 1/2013 |
| WO | 2006/035044 A1 | 4/2006 |

OTHER PUBLICATIONS

Extended European Search Report dated Mar. 14, 2016 in corresponding European Patent Application No. 13872254.1.
Chinese Office Action and Search Report dated Jul. 2, 2015 in corresponding Chinese Patent Application No. 201380000173.7.
PCT International Search Report dated Oct. 31, 2013 in corresponding International Patent Application No. PCT/CN2013/070785.

* cited by examiner

METHOD, APPARATUS, AND SYSTEM FOR INCREASING NETWORK SECURITY

CROSS-REFERENCE TO RELATED APPLICATIONS

This application is a continuation of International Application No. PCT/CN2013/070785, filed on Jan. 21, 2013, which is hereby incorporated by reference in its entirety.

TECHNICAL FIELD

Embodiments of the present invention relate to the field of communications technologies, and in particular, to a method, an apparatus, and a system for increasing network security.

BACKGROUND

In a security networking scenario, a network element may automatically applies to a public key infrastructure (PKI, Public Key Infrastructure) system of an operator for a device certificate, and the PKI system issues a certificate for the network element after identity identification of the network element is passed. Taking the certificate as an identity credential, the network element may pass through a security gateway and a firewall of the operator, and is trusted by a network element in a security domain. The certificate is borne over a physical entity implementing a function of the network element, the physical entity implementing the function of the network element may be referred to as a network element device, and the certificate borne over the network element device is bound to an identity of the network element device (briefly referred to as network element device identity). The certificate borne over the network element device may be specifically borne over one board of the network element device.

If the network element is removed or the network element device is changed for the network element, the removed network element device may enter a range (such as an equipment vendor or an outsourcing repair service supplier) out of the control of the operator, but the certificate on the network element device is still valid. Once the certificate is leaked, a risk that the certificate is used to intrude into a network of the operator arises. For example, a person who gains access to the network element device uses the certificate on the network element device to gain access to the network of the operator so as to attack a network using the network element device, where possible attack manners include:

copying the certificate, gaining access to the network by using another device, and initiating an attack on the network;

controlling the network element device to gain access to a network without permission, and initiating a flood attack on a network in the security domain; and controlling the network element device to initiate one or another attacks on a network element in the security domain.

SUMMARY

In view of this, embodiments of the present invention provide a method, an apparatus, and a system for increasing network security, so as to implement automatic revocation of a digital certificate for a network element device out of a network environment, thereby ensuring that a device certificate of an operator is used with permission, and increasing network security for the operator.

According to a first aspect, a method for increasing network security is provided and includes: saving, by a network management system, a first list, where the first list is used to store certificate information being used by a network element, and the first list includes a network element identity (ID, identity), a network element device identity (ID, identity), an issuer of a certificate, and a serial number of the certificate; when determining that a certificate corresponding to the certificate information in the first list needs to be revoked, generating, by the network management system, a certificate revocation request file according to the certificate information, and deleting the certificate information in the first list from the first list, where the certificate revocation request file is used to request revocation of the certificate needing to be revoked; and sending, by the network management system, the certificate revocation request file to a public key infrastructure (PKI) system.

In a possible implementation manner of the first aspect, the when determining that a certificate corresponding to the certificate information in the first list needs to be revoked, generating, by the network management system, a certificate revocation request file according to the certificate information includes: saving, by the network management system, a second list, where the second list is used to store certificate information needing to be revoked; when determining that the certificate corresponding to the certificate information in the first list needs to be revoked, transferring, by the network management system, the certificate message into the second list, and generating, by the network management system, the certificate revocation request file according to the certificate information in the second list.

With reference to the first aspect or the first possible implementation manner of the first aspect, in a second possible implementation manner, that the network management system determines that the certificate information in the first list needs to be revoked includes: determining, by determining that a managed network element device is changed or the network element is discarded, that the certificate information in the first list needs to be revoked.

With reference to the second possible implementation manner of the first aspect, in a third possible implementation manner, the method further includes: receiving, by the network management system, a certificate message reported by a managed network element, where the certificate message includes certificate information, and the certificate information includes a network element ID of the network element, a network element device ID, an issuer of a certificate, and a serial number of the certificate; determining, by the network management system by determining that the network element device ID in the received certificate message of a network element device of the network element is inconsistent with the network element device ID of the network element stored in the first list, that the network element device of the network element reporting the certificate message is changed.

With reference to the third possible implementation manner of the first aspect, in a fourth possible implementation manner, the method further includes: moving the certificate information in the reported certificate message into the first list.

With reference to the first aspect or the first or second implementation manner of the first aspect, in a fifth possible implementation manner, the method further includes:

receiving, by the network management system, a certificate message reported by a managed network element, where the certificate message includes certificate information, and the certificate information includes a network element ID of the network element, an ID of a network element device in the network element, an issuer of a certificate, and a serial number of the certificate; and updating, by the network management system, the first list according to the certificate information in the received certificate message and the certificate information in the first list.

With reference to the fifth possible implementation manner of the first aspect, in a sixth possible implementation manner, the updating, by the network management system, the first list according to the certificate information in the received certificate message and the certificate information in the first list includes: when determining that the ID of the network element device of the network element reported by the network element is not in the first list, moving, by the network management system, the certificate information in the received certificate message reported by the network element device of the managed network element into the first list.

With reference to the fifth possible implementation manner of the first aspect, in a seventh possible implementation manner, the updating, by the network management system, the first list according to the certificate information in the received certificate message and the certificate information in the first list includes: when determining that the ID of the network element device in the received certificate message of the network element device of the network element is consistent with the ID of the network element device of the network element stored in the first list but serial numbers are inconsistent, updating, by the network management system, the serial number in the certificate information of the network element device of the network element in the first list.

With reference to the first aspect or the first to seventh possible implementation manner of the first aspect, in an eighth possible implementation manner, the generating, by the network management system, a certificate revocation request file according to certificate information corresponding to the certificate needing to be revoked includes: generating, by the network management system, a corresponding certificate revocation request file for different certificate authorities (Certificate Authority, CA), according to the certificate information corresponding to the certificate needing to be revoked.

With reference to the eighth possible implementation manner of the first aspect, in a ninth possible implementation manner, certificates issued by the different CAs are indicated by issuers of certificates in the certificate information.

According to a second aspect, an apparatus for increasing network security is provided and includes: a saving unit, a processing unit, and a sending unit; the saving unit is configured to save a first list, where the first list is used to store certificate information being used by a network element, and the certificate information in the first list includes a network element identity (ID, identity), a network element device identity (ID, identity), an issuer of a certificate, and a serial number of the certificate; the processing unit is configured to, when determining that a certificate corresponding to the certificate information in the first list needs to be revoked, generate a certificate revocation request file according to the certificate information, and remove the certificate information in the first list from the first list, where the certificate revocation request file is used to request revocation of the certificate needing to be revoked; and the sending unit is configured to send the certificate revocation request file generated by the processing unit to a public key infrastructure (PKI, Public Key Infrastructure) system.

In a first possible implementation manner of the second aspect, that the processing unit is configured to, when determining that a certificate corresponding to the certificate information in the first list needs to be revoked, generate a certificate revocation request file according to the certificate information, and remove the certificate information in the first list from the first list includes: the processing unit is configured to save a second list, where the second list is used to store certificate information needing to be revoked; and the processing unit is further configured to, when determining that the certificate corresponding to the certificate information in the first list needs to be revoked, transfer the certificate information into the second list, and generate the certificate revocation request file according to the certificate information in the second list, where the certificate revocation request file is used to request revocation of a certificate corresponding to the certificate information in the second list.

With reference to the second aspect or the first possible implementation manner of the second aspect, in a second possible implementation manner, the processing unit is configured to determine, by determining that a network element device of a managed network element is changed or the network element device is discarded, that the certificate information in the first list needs to be revoked.

With reference to the second possible implementation manner of the second aspect, in a third possible implementation manner, the apparatus further includes a receiving unit, configured to receive a certificate message reported by the managed network element, where the certificate message includes certificate information, and the certificate information includes a network element ID of the network element, an ID of a network element device in the network element, an issuer of a certificate of the network element, and a serial number of the certificate of the network element; and the processing unit is configured to determine, by determining that the ID of the network element device in the received certificate message of the network element device of the network element is inconsistent with the network element device ID of the network element stored in the first list, that the network element device of the network element reporting the certificate message is changed.

With reference to the third possible implementation manner of the second aspect, in a fourth possible implementation manner, the processing unit is further configured to move the certificate information in the reported certificate message into the first list.

With reference to the second aspect or the first or second possible implementation manner of the second aspect, in a fifth possible implementation manner, the apparatus further includes a receiving unit, configured to receive a certificate message reported by the network element device of the managed network element, where the certificate message includes certificate information, and the certificate information includes a network element ID of the network element, an ID of the network element device in the network element, an issuer of a certificate of the network element, and a serial number of the certificate of the network element; and the processing unit is further configured to update the first list according to the certificate information in the received certificate message and the certificate information in the first list.

With reference to the fifth possible implementation manner of the second aspect, in a sixth possible implementation manner, the processing unit is configured to, when determining that the ID of the network element device of the network element reported by the network element is not in the first list, move the certificate information in the received certificate message reported by the network element device of the managed network element into the first list to update the first list.

With reference to the fifth possible implementation manner of the second aspect, in a seventh possible implementation manner, the processing unit is configured to update the serial number in the certificate information of the network element device of the network element in the first list to update the first list when determining that the ID of the network element device in the received certificate message of the network element device of the network element is consistent with the ID of the network element device of the network element stored in the first list but serial numbers are inconsistent.

With reference to the second aspect or the first to seventh possible implementation manner of the second aspect, in an eighth possible implementation manner, a certificate revocation request file is generated for certificates issued by different certificate authorities (Certificate Authority, CA).

With reference to the eighth possible implementation manner of the second aspect, in a ninth possible implementation manner, the certificates issued by the different certificate authorities (Certificate Authority, CA) are indicated by issuers of certificates in the certificate information.

According to a third aspect, a method for increasing network security is provided and includes: receiving, by a network element device of a network element, a certificate message delivered by a public key infrastructure (PKI, Public Key Infrastructure), where the certificate message includes certificate information, and the certificate information includes a network element identity, a network element device identity, an issuer of a certificate, and a serial number of the certificate; checking, by the network element device of the network element, whether a certificate corresponding to the received certificate information is valid, loading the certificate onto the network element device when determining that the certificate is valid; and reporting, by the network element device of the network element, a certificate message to a network management system, where the certificate message includes certificate information of the certificate loaded onto the network element device, the certificate information includes a network element identity, an identity (ID, Identity) of the network element device, an issuer of the certificate, and a serial number of the certificate, and the certificate message is used by the network management system to update, according to the certificate information in the certificate message and stored certificate information of the network element device of the network element, certificate information needing to be revoked, and to generate, according to the certificate information needing to be revoked, a certificate revocation request file used to request the PKI to revoke a certificate corresponding to the certificate information needing to be revoked.

According to a fourth aspect, an apparatus for increasing network security is provided and includes: a receiving unit, a processing unit, and a sending unit; the receiving unit is configured to receive a certificate message sent by a public key infrastructure (PKI, Public Key Infrastructure) system to the apparatus, where the certificate message includes certificate information, and the certificate information includes a network element identity, an identity of a network element device, an issuer of a certificate, and a serial number of the certificate; the processing unit is configured to check whether the certificate message is valid, and load the certificate onto the apparatus when determining that the certificate message is valid; and the sending unit is configured to send a certificate message to a network management system, where the certificate message includes certificate information of the certificate loaded onto the network element device, the certificate information includes a network element identity, an identity of the network element device, an issuer of the certificate, and a serial number of the certificate, and the certificate message is used by the network management system to update, according to the certificate information in the certificate message and stored certificate information of the network element device of the network element, certificate information needing to be revoked, and to generate, according to the certificate information needing to be revoked, a certificate revocation request file used to request the PKI to revoke a certificate corresponding to the certificate information needing to be revoked.

According to a fifth aspect, a system for increasing network security is provided and includes a network element and a network management system, where the network management system is the second aspect or any one of the first to ninth possible implementation manners of the second aspect.

In a first possible implementation manner of the fifth aspect, the network element is the fourth aspect.

With reference to the fifth aspect or the first possible implementation manner of the fifth aspect, in a second possible implementation manner, the system further includes: a public key infrastructure (PKI, Public Key Infrastructure) system, configured to send a certificate message to the apparatus, where the certificate message includes certificate information, and the certificate information includes a network element identity, a network element device identity, an issuer of a certificate, and a serial number of the certificate; and receive a certificate revocation request file that is sent by the network management system and used to request the PKI to revoke a certificate corresponding to certificate information needing to be revoked.

According to the method, the apparatus, and the system in the embodiments of the present invention, automatic revocation of a digital certificate may be implemented for a network element device out of a network environment, thereby ensuring that a device certificate of an operator is not illegally used, and increasing network security for the operator.

DESCRIPTION OF EMBODIMENTS

The following clearly and describes the technical solutions in the embodiments of the present invention with reference to the accompanying drawings in the embodiments of the present invention. It may be understood that the described embodiments are merely a part rather than all of the embodiments of the present invention. All other embodiments obtained by a person of ordinary skill in the art based on the embodiments of the present invention without creative efforts shall fall within the protection scope of the present invention.

Figure 1A:
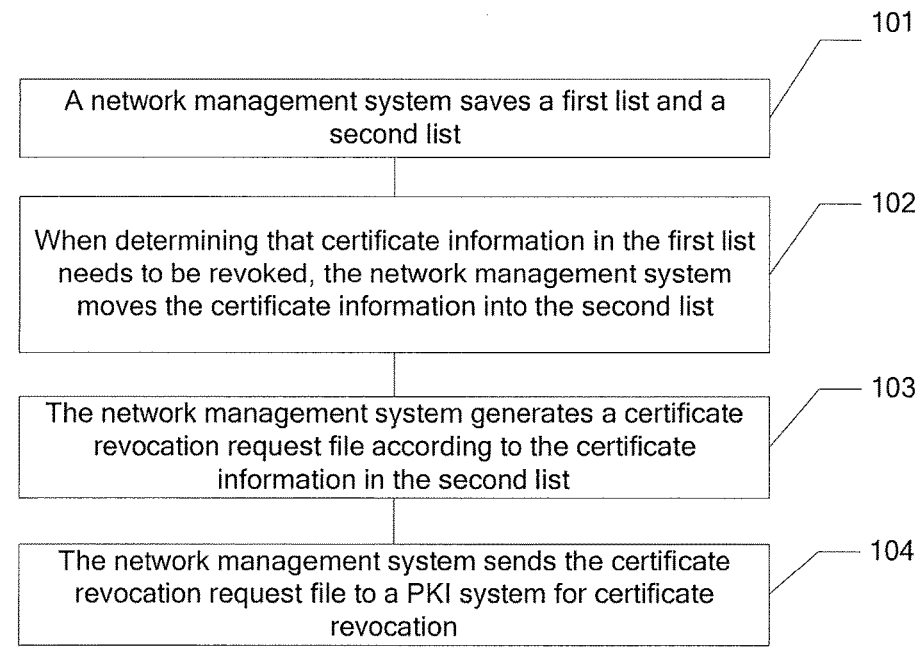
FIG. 1a is a flowchart of a method for increasing network security according to an embodiment of the present invention.
Figure 1:
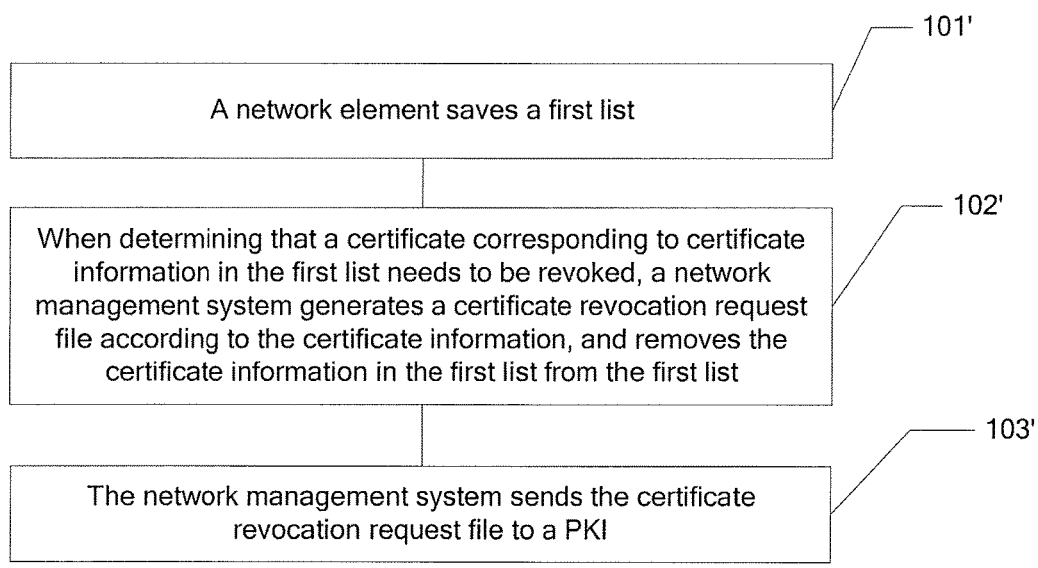
FIG. 1b is a flowchart of a method for increasing network security according to an embodiment of the present invention.

In an embodiment of the present invention, a method for increasing network security is provided. As shown in FIG. 1a, the method includes:

Step 101: A network management system saves a first list and a second list.

The first list is used to store certificate information being used by a network element, the second list is used to store certificate information needing to be revoked, and certificate information in both the first list and the second list include a network element identity (ID, identity), a network element device identity (ID, identity), an issuer of a certificate, and a serial number of the certificate. A network element device is a physical entity of the network element and is configured to implement a function of the network element.

The first list and the second list embody correspondences between a network element ID, a network element device ID, an issuer of a certificate, and a serial number of the certificate, may be a list saved in reality, and may not be a list saved in reality. The network element ID, the network element device ID, issuers of certificates, and serial numbers of the certificates in the first list and the second list may be separately saved in different addresses of a storage medium of the network management system and are mapped to a list form in a pointer manner or in other manners, which may not be limited herein.

The network management system may acquire and save a network element identity of the network element, a network element device identity, an issuer of a certificate, and a serial number of the certificate by managing the network element. The network element may be a base station, a security gateway, a router, or the like.

Alternatively, the network management system may store only the first list for storing the certificate information being used by the network element.

Step 102: When determining that the certificate information in the first list needs to be revoked, the network management system moves the certificate information into the second list.

A time when the first list needs to be revoked may be a time when the network element device is changed or the network element is discarded. Specifically, the network management system may determine that the network element device is changed by determining that a network element device ID in a certificate message most recently reported by the network element is inconsistent with the network element device ID stored in the first list, where a certificate message that the network element may report includes certificate information, and the certificate information includes a network element ID of the network element, a network element device ID, an issuer of a certificate, a serial number of the certificate, and the like. The network element may report the certificate message to the network management system through a management and maintenance channel.

When the network element is discarded, the network management system may be informed, and then the network management system may determine that a certificate message in the first list needs to be revoked. When determining that the certificate information in the first list needs to be revoked, the network management system transfers the certificate information into the second list. A specific method for informing the network management system that the network element is discarded may be an existing manner, for example, the network management system receives a message and learns that a certain network element is discarded, and it may also be another manner, which may not be limited herein.

When determining that the network element device is changed, the network management system may further transfer the certificate information in the certificate message reported by the network element into the first list.

When the network management system determines that the network element is discarded, the network management system may further delete information about the network element, where the information may include the network element identity of the network element, the network element device identity, the issuer of the certificate, and the serial number of the certificate.

Alternatively, when the network management system stores only the first list and when the network management system determines that the certificate information in the first list needs to be revoked, the network management system generates a revocation request file according to the certificate information and removes the certificate information from the first list. Specifically, when the network element device of the network element is changed, certificate information of a new network element replaces the certificate information of the network element in the first list; when the network element is discarded, the network management system deletes the certificate information of the network element from the first list and deletes the information about the network element.

Alternatively, when determining that a network element device is newly added, the network management system transfers the certificate information in the certificate message reported by the network element into the first list, where the network management system may determine that that a network element device is newly added by determining that the network element device ID reported by the network element is not stored in the first list. It may be understood that, the network management system may obtain an initial value of the certificate information in the first list in this manner.

Alternatively, when determining that the certificate of the network element changed, the network management system transfers the certificate information in the certificate message reported by the network element into the first list, where the network management system may determine whether the network element changes the certificate in the following manner: the network management system determines that the network element device ID reported by the network element is consistent with the network element device ID stored in the first list but the reported serial number is inconsistent with the serial number stored in the first list.

When the certificate of the network element expires, the network element applies to a public key infrastructure (Public Key Infrastructure, PKI) system for a new certificate. The PKI system issues a new certificate to the network element according to the application of the network element. The network management system acquires and records the new certificate of the network element by managing the network element. A serial number in certificate information corresponding to the new certificate is different from the serial number in the certificate information corresponding to the expired certificate, but other information is the same.

Step 103: The network management system generates a certificate revocation request file according to the certificate information in the second list.

The network management system may regularly generate a certificate revocation request file according to the certificate information in the second list, and the regular time interval may be set as required. The network management system may also generate a certificate revocation request file according to the certificate information in the second list in real time, for example, when it is determined that there is certificate information needing to be revoked in the second list, or in response to a request of another device, such as a request of a PKI system.

Specifically, when there is more than one issuer in the certificate information, the network management system may generate a corresponding certificate revocation request file according to different issuers in the certificate information, where the different issuers are corresponding to different certificate authorities (Certificate Authority, CA), and the CAs may be main physical entities implementing a function of the PKI system.

Step 104: The network management system sends the certificate revocation request file to a public key infrastructure (PKI) system for certificate revocation.

Specifically, the network management system may regularly send a generated certificate revocation request file to the PKI system, where the regular time interval may be set as required. The network management system may also send a generated certificate revocation request file to the PKI system in real time, for example, when it is determined that a certificate revocation request file is generated, or in response to a request of another device, such as a request of the PKI system. Details are not limited herein.

According to the method in this embodiment, a network management system may perform automatic revocation of a certificate for a network element device out of a network environment, for example, a changed network element device or a removed network element device, thereby avoiding illegal use of the certificate. Further, the network management system may further automatically update certificate information stored in the network management system when a network element device is newly added or a network element changes a certificate. In one aspect, manual operation costs can be reduced and real-time performance can be increased, and in another aspect, an error risk brought by a manual operation can be avoided and network security can be increased.

In another embodiment of the present invention, a method for increasing network security is provided. As shown in FIG. 1*b*, the method includes:

Step 101': A network element saves a first list.

The first list is used to store certificate information being used by the network element, and the certificate information in the first list includes a network element identity (ID, identity), a network element device identity (ID, identity), an issuer of a certificate, and a serial number of the certificate. The network element device is a physical entity of the network element and is configured to implement a function of the network element.

Step 102': When determining that a certificate corresponding to certificate information in the first list needs to be revoked, a network management system generates a certificate revocation request file according to the certificate information and removes the certificate information in the first list from the first list.

The certificate revocation request file is used to request revocation of the certificate needing to be revoked.

When the network management system stores only the first list and when the network management system determines that the certificate information in the first list needs to be revoked, the network management system generates a revocation request file according to the certificate information and removes the certificate information from the first list. Specifically, when the network element device of the network element is changed, certificate information of a new network element replaces the certificate information of the network element in the first list; when the network element is discarded, the network management system deletes the certificate information of the network element from the first list and deletes information about the network element.

Alternatively, when determining that a network element device is newly added, the network management system transfers certificate information in a certificate message reported by the network element into the first list, where the network management system may determine that a network element device is newly added by determining that a network element device ID reported by the network element is not stored in the first list. It may be understood that, the network management system may obtain an initial value of the certificate information in the first list in this manner.

Alternatively, when determining that the network element changes the certificate, the network management system transfers the certificate information in the certificate message reported by the network element into the first list, where the network management system may determine whether the network element changes the certificate in the following manner: the network management system determines that the network element device ID reported by the network element is consistent with the network element device ID stored in the first list but a reported serial number is inconsistent with the serial number stored in the first list.

When the certificate of the network element expires, the network element applies to a public key infrastructure (Public Key Infrastructure, PKI) system for a new certificate. The PKI system delivers a new certificate to the network element according to the application of the network element. The network management system acquires and records the new certificate of the network element by managing the network element. A serial number in certificate information corresponding to the new certificate is different from the serial number in the certificate information corresponding to the expired certificate, but other information is the same.

Step 103': The network management system sends the certificate revocation request file to a public key infrastructure (PKI) system.

According to the method in this embodiment, a network management system may perform automatic revocation of a certificate for a network element device out of a network environment, for example, a changed network element device or a removed network element device, thereby avoiding illegal use of the certificate. Further, the network management system may further automatically update certificate information stored in the network management system when a network element device is newly added or a network element changes a certificate. In one aspect, manual operation costs can be reduced and real-time performance can be increased, and in another aspect, an error risk brought by a manual operation can be avoided and network security can be increased.

Figure 2A:
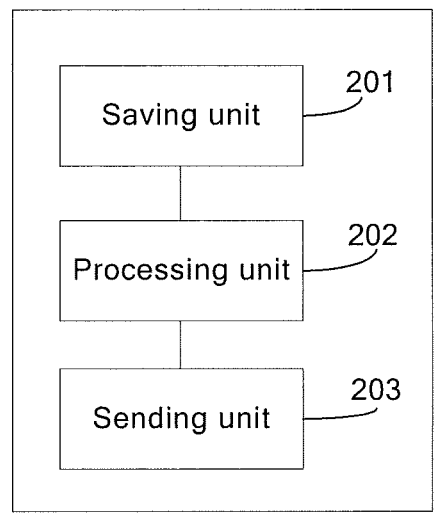
FIG. 2a is a schematic diagram of an apparatus for increasing network security according to an embodiment of the present invention.

In another embodiment of the present invention, an apparatus for increasing network security is provided. As shown in FIG. 2a, the apparatus includes: a saving unit 201, a processing unit 202, and a sending unit 203.

The saving unit 201 is configured to save a first list and a second list, where the first list is used to store certificate information being used by a network element, the second list is used to store certificate information needing to be revoked, and certificate information in both the first list and the second list include a network element identity (ID, identity), an identity (ID, identity) of a network element device (briefly referred to as network element device identity) of a network element, an issuer of a certificate, and a serial number of the certificate. The network element device is a physical entity of the network element and is configured to implement a function of the network element. The first list and the second list embody correspondences between a network element ID, a network element device ID, an issuer of a certificate, and a serial number of the certificate. For details, refer to the existing specific description in the foregoing embodiment, which is not repeated herein.

Alternatively, the saving unit may save only the first list, where the first list is used to store the certificate information being used by the network element.

A network management system may acquire and save a network element identity of the network element, a network element device identity, an issuer of a certificate, and a serial number of the certificate by managing the network element. The network element may be a base station, a security gateway, a router, or the like.

The processing unit 202 is configured to transfer the certificate information in the first list into the second list when determining that the certificate information needs to be revoked.

A time when the first list needs to be revoked may be a time when the processing unit 202 determines that the network element device is changed or the network element is discarded. For a method for the processing unit 202 to specifically determine that the network element is changed or the network element is discarded, reference may be made to the existing detailed description in the foregoing embodiment, which is not repeated herein.

Specifically, when the network element is discarded, the processing unit 202 acquires, by managing the network element by the apparatus, a message indicating that the network element is discarded. In this case, the processing unit 202 determines that a certificate message in the first list needs to be revoked and moves the certificate information into the second list.

The processing unit 202 is further configured to delete information about the network element when determining that the network element is discarded, where the information about the network element includes a network element identity of the network element, a network element device identity, an issuer of a certificate, and a serial number of the certificate.

The processing unit 202 is further configured to transfer certificate information in a certificate message reported by the network element into the first list when determining that the network element device is changed.

Alternatively, when the processing unit 202 stores only the first list and when the processing unit 202 determines that the certificate information in the first list needs to be revoked, the processing unit 202 generates a revocation request file according to the certificate information and removes the certificate information from the first list. Specifically, when the network element device of the network element is changed, certificate information of a new network element replaces the certificate information of the network element in the first list; when the network element is discarded, the network management system deletes the certificate information of the network element from the first list and deletes the information about the network element.

Alternatively, the processing unit 202 is further configured to transfer the certificate information in the certificate message reported by the network element into the first list when determining that a network element device is newly added, where the processing unit 202 may determine that a network element device is newly added by determining that a network element device ID reported by the network element is not stored in the first list. It may be understood that, an initial value stored in the first list may be obtained in this manner.

Alternatively, the processing unit 202 is further configured to transfer the certificate information in the certificate message reported by the network element into the first list when determining that the network element changes the certificate, where the processing unit 202 may determine whether the network element changes the certificate in the following manner: the processing unit 202 determines that the network element device ID reported by the network element is consistent with the network element device ID stored in the first list but a reported serial number is inconsistent with the serial number stored in the first list. When the certificate of the network element expires, the network element applies to a PKI system for a new certificate. The PKI system delivers a new certificate to the network element according to the application of the network element. The processing unit 202 may acquire and record the new certificate of the network element by managing the network element by the apparatus. A serial number in certificate information corresponding to the new certificate is different from the serial number in the certificate information corresponding to the expired certificate, but other information is the same.

The processing unit 202 is further configured to generate a certificate revocation request file according to the certificate information in the second list, where the certificate revocation request file is used to request revocation of a certificate corresponding to the certificate information in the second list.

Specifically, the processing unit 202 may be configured to regularly generate a certificate revocation request file according to the certificate information in the second list, where the regular time interval may be set as required. The processing unit 202 may also be configured to generate a certificate revocation request file according to the certificate information in the second list in real time or in response to a request of another device, such as a request of the PKI system. When determining that there is certificate information needing to be revoked in the second list, the network management system may generate a certificate revocation request file and send it to the PKI system for certificate revocation.

When there is more than one issuer in the certificate information, the processing unit 202 may be configured to generate a corresponding certificate revocation request file according to different issuers in the certificate information, where the different issuers are issued by different CAs, and the CAs may be main physical entities implementing a function of the PKI system.

The sending unit 203 is configured to send the certificate revocation request file generated by the processing unit 202 to the PKI system for certificate revocation.

According to the apparatus in this embodiment, automatic revocation of a certificate may be performed for a network element device out of a network environment, for example, a changed network element device or a removed network element device, thereby avoiding illegal use of the certificate. Further, a network management system may further automatically update certificate information stored in the network management system when a network element device is newly added or a network element changes a certificate. In one aspect, manual operation costs can be reduced and real-time performance can be increased, and in another aspect, an error risk brought by a manual operation can be avoided and network security can be increased.

In another embodiment of the present invention, an apparatus for increasing network security is provided. As shown in FIG. 2b, the apparatus includes: a storage unit 201', a processing unit 202', and a sending unit 203'.

The storage unit 201' is configured to save a first list, where the first list is used to store certificate information being used by a network element, and the first list includes a network element identity (ID, identity), an identity (ID, identity) of a network element device (briefly referred to as network element device identity) in a network element, an issuer of a certificate, and a serial number of the certificate. The network element device is a physical entity of the network element and is configured to implement a function of the network element. The first list embodies correspondences between the network element ID, the network element device ID, the issuer of the certificate, and the serial number of the certificate. For details, refer to the existing specific description in the foregoing embodiment, which is not repeated herein.

A network management system may acquire and save the network element identity of the network element, the network element device identity, the issuer of the certificate, and the serial number of the certificate by managing the network element. The network element may be a base station, a security gateway, a router, or the like.

The processing unit 202' is configured to, when determining that the certificate information in the first list needs to be revoked, generate a revocation request file according to the certificate information and remove the certificate information in the first list from the first list. The certificate revocation request file is used to request revocation of the certificate needing to be revoked. Specifically, when the network element device of the network element is changed, certificate information of a new network element replaces the certificate information of the network element in the first list; when the network element is discarded, the network management system deletes the certificate information of the network element from the first list and deletes information about the network element.

A time when the first list needs to be revoked may be a time when the processing unit 202' determines that the network element device is changed or the network element is discarded. For a method for the processing unit 202' to specifically determine that the network element is changed or the network element is discarded, reference may be made to the existing detailed description in the foregoing embodiment, which is not repeated herein.

Specifically, when the network element is discarded, the processing unit 202' may acquire, by managing the network element by the apparatus, a message indicating that the network element is discarded.

The processing unit 202' is further configured to delete the information about the network element when determining that the network element is discarded, where the information about the network element includes the network element identity of the network element, the network element device identity, the issuer of the certificate, and the serial number of the certificate.

The processing unit 202' may be further configured to transfer certificate information in a certificate message reported by the network element into the first list when determining that the network element device is changed.

The processing unit 202' may be further configured to transfer, when determining that a network element device is newly added, the certificate information in the certificate message reported by the network element into the first list, where the processing unit 202' may determine that a network element device is newly added by determining that a network element device ID reported by the network element is not stored in the first list. It may be understood that, an initial value stored in the first list may be obtained in this manner.

The processing unit 202' may be further configured to transfer the certificate information in the certificate message reported by the network element into the first list when determining that the network element changes the certificate, where the processing unit 202' may determine whether the network element changes the certificate in the following manner:

the processing unit 202' determines that the network element device ID reported by the network element is consistent with the network element device ID stored in the first list but a reported serial number is inconsistent with the serial number stored in the first list. When the certificate of the network element expires, the network element applies to a PKI system for a new certificate. The PKI system delivers a new certificate to the network element according to the application of the network element. The processing unit 202' may acquire and record the new certificate of the network element by managing the network element by the apparatus. A serial number in certificate information corresponding to the new certificate is different from the serial number in the certificate information corresponding to the expired certificate, but other information is the same.

When there is more than one issuer in the certificate information, the processing unit 202' may generate a corresponding certificate revocation request file according to different issuers in the certificate information, where the different issuers are issued by different CAs, and the CAs may be main physical entities implementing a function of the PKI system.

The sending unit 203' is configured to send the certificate revocation request file generated by the processing unit 20T to the PKI system for certificate revocation.

According to the apparatus in this embodiment, automatic revocation of a certificate may be performed for a network element device out of a network environment, for example, a changed network element device or a removed network element device, thereby avoiding illegal use of the certificate. Further, a network management system may further automatically update certificate information stored in the network management system when a network element device is newly added or a network element changes a certificate. In one aspect, manual operation costs can be reduced and real-time performance can be increased, and in another aspect, an error risk brought by a manual operation can be avoided and network security can be increased.

Figure 3:
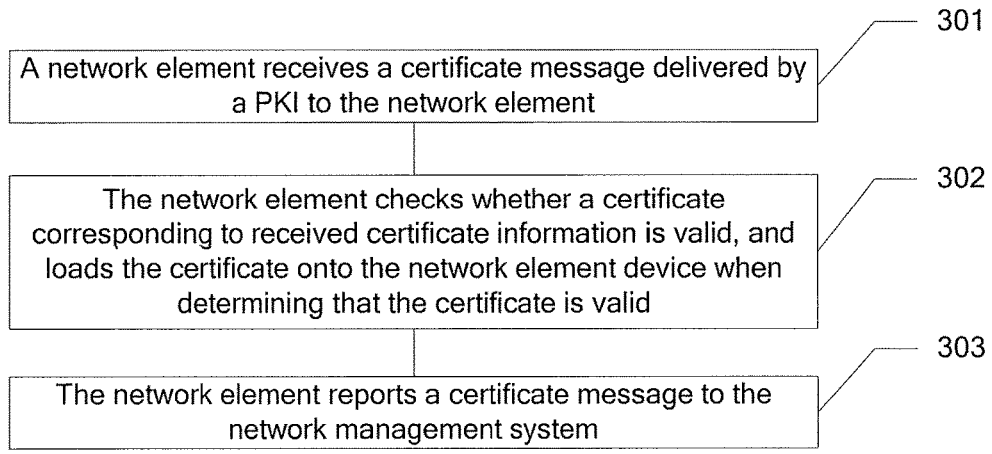
FIG. 3 is a schematic flowchart of a method for increasing network security according to an embodiment of the present invention.

In another embodiment of the present invention, a method for increasing network security is provided. As shown in FIG. 3, the method includes:

Step 301: A network element receives a certificate message delivered by a PKI to the network element, where the certificate message includes certificate information, and the certificate information includes a network element identity of the network element, a network element device identity, an issuer of a certificate, and a serial number of the certificate.

The network element may receive, through a CMPv2 interface, the certificate information delivered by the PKI system to the network element. The network element may be a base station, a security network management system, a router, or the like.

Step 302: The network element checks whether a certificate corresponding to the received certificate information is valid, and loads the certificate onto the network element device when determining that the certificate is valid.

The network element checks whether a certificate corresponding to the certificate message that is delivered by the PKI system is valid, and loads the certificate onto the network element device if it is determined that the certificate is valid, where the network element device is a physical entity implementing a function of the network element and is configured to implement the function of the network element. For a specific checking method, reference may be made to an existing method or other methods, which may not be limited herein.

Alternatively, when the network element checks the received certificate and determines that the certificate is invalid, the network element may delete the certificate information and apply to the PKI system for a certificate again. After the network element receives a certificate delivered by the PKI system, step 302 is repeated.

Step 303: The network element reports a certificate message to a network management system, where the certificate message includes certificate information of the certificate loaded onto the network element device.

The certificate information includes a network element identity of the network element, a network element device identity, an issuer of the certificate, and a serial number of the certificate. The certificate message is used by the network management system to update, according to the certificate information in the certificate message and stored certificate information of the network element, certificate information needing to be revoked, and to generate, according to the certificate information needing to be revoked, a certificate revocation request file used to request the PKI to revoke a certificate corresponding to the certificate information needing to be revoked.

According to the method in this embodiment, a network element may perform automatic revocation of a certificate for a network element device out of a network environment, for example, a changed network element device or a removed network element device, thereby avoiding illegal use of the certificate. Further, a network management system may further automatically update certificate information stored in the network management system when a network element device is newly added or a network element changes a certificate. In one aspect, manual operation costs can be reduced and real-time performance can be increased, and in another aspect, an error risk brought by a manual operation can be avoided and network security can be increased.

In another embodiment, an apparatus for increasing network security is provided.

Figure 4:
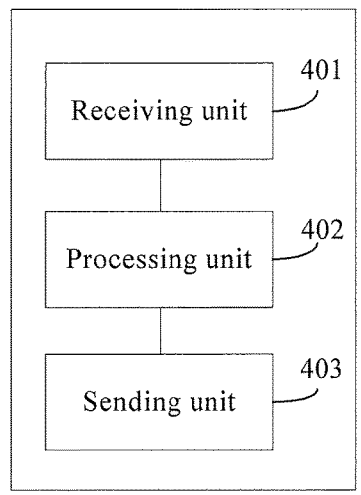
FIG. 4 is a schematic diagram of an apparatus for increasing network security according to an embodiment of the present invention.

As shown in FIG. 4, the apparatus includes a receiving unit 401, a processing unit 402, and a sending unit 403.

The receiving unit 401 is configured to receive a certificate message sent by a PKI system to the apparatus, where the certificate message includes certificate information, and the certificate information includes a network element identity, a network element device identity, an issuer of a certificate, and a serial number of the certificate.

The processing unit 402 is configured to check whether the certificate message is valid, and load the certificate onto the apparatus when determining that the certificate message is valid.

When the processing unit 402 checks the received certificate and determines that the certificate is invalid, the processing unit may delete the certificate information and apply to the PKI system for a certificate again. After a network element to which the processing unit 402 belongs receives a certificate delivered by the PKI system, certificate validity is checked again.

The sending unit 403 is configured to send a certificate message to a network management system, where the certificate message includes certificate information of the certificate loaded onto the network element device, the certificate information includes a network element identity, an identity of the network element device, an issuer of the certificate, and a serial number of the certificate, and the certificate message is used by the network management system to update, according to the certificate information in the certificate message and stored certificate information of the network element device of the network element, certificate information needing to be revoked, and to generate, according to the certificate information needing to be revoked, a certificate revocation request file used to request the PKI to revoke a certificate corresponding to the certificate information needing to be revoked.

According to the apparatus in this embodiment, automatic revocation of a certificate may be performed for a network element device out of a network environment, for example, a changed network element device or a removed network element device, thereby avoiding illegal use of the certificate. Further, a network management system may further automatically update certificate information stored in the network management system when a network element device is newly added or a network element changes a certificate. In one aspect, manual operation costs can be reduced and real-time performance can be increased, and in another aspect, an error risk brought by a manual operation can be avoided and network security can be increased.

Figure 5:
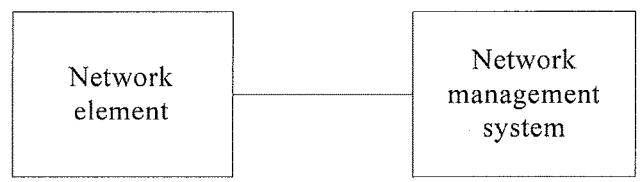
FIG. 5 is a structural diagram of a system for increasing network security according to an embodiment of the present invention.

In another embodiment, a system for increasing network security is provided. As shown in FIG. 5, the system includes a network management system and a network element.

Figure 2:
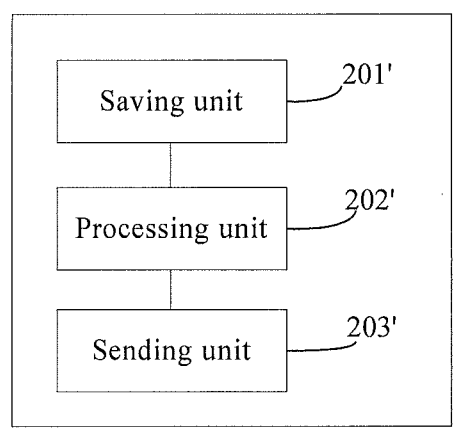
FIG. 2b is a schematic diagram of an apparatus for increasing network security according to an embodiment of the present invention.

The network management system may be the apparatus descried in the embodiment shown in FIG. 2. For details, reference may be made to the existing detailed description in the foregoing embodiment, which is not repeated herein.

Further, the network element may be the apparatus descried in the embodiment shown in FIG. 4. For details, reference may be made to the existing detailed description in the foregoing embodiment, which is not repeated herein.

The network management system is configured to, when determining, according to certificate information in the certificate message, that a certificate needs to be revoked, generate a certificate revocation request file and send it to a PKI system for certificate revocation, and accordingly update certificate information being used by the network element.

Further, the network element is configured to send the certificate message to the network management system, so that the network management system determines, according to the certificate information in the certificate message, whether the certificate message needs to be revoked and accordingly updates the certificate information being used by the network element.

Further, a public key infrastructure (PKI, Public Key Infrastructure) system is further included and is configured to send a certificate message to the apparatus, where the certificate message includes certificate information, and the certificate information includes a network element identity, a network element device identity, an issuer of the certificate, and a serial number of the certificate, and to receive a certificate revocation request file that is sent by the network management system and used to request the PKI to revoke a certificate corresponding to certificate information needing to be revoked.

According to the system in this embodiment, the network management system may perform automatic revocation of a certificate for a network element device out of a network environment, for example, a changed network element device or a removed network element device, thereby avoiding illegal use of the certificate. Further, the network management system may further automatically update certificate information stored in the network management system when a network element device is newly added or the network element changes a certificate. In one aspect, manual operation costs can be reduced and real-time performance can be increased, and in another aspect, an error risk brought by a manual operation can be avoided and network security can be increased.

In another embodiment, a method for increasing network security when a network element device is changed is specifically provided and includes:

A network management system saves a first list and a second list, where the first list may be indicated by an OnlineCERT list, and the second list may be indicated by a RevokeCERT list. The OnlineCERT list is used to store certificate information being used by a network element, and the RevokeCERT list is used to store certificate information needing to be revoked.

Certificate information includes a network element identity of a network element, a network element device identity (ID, Identity), an issuer of a certificate, and a serial number of the certificate in a certificate message.

A format of the OnlineCERT list may be:

| Network element identity 1 | CN1: ESN1.XXX | Certificate issuer | Certificate serial number 1 |
|---|---|---|---|
| Network element identity 2 | CN2: ESN2.XXX | Certificate issuer | Certificate serial number 2 |
| ... | ... | ... | ... |
| Network element identity n | CNn: ESNn.XXX | Certificate issuer | Certificate serial number n |

In table 1, n>=2

The first column of the table records a network element identity, and the second column of the table records an ID of a network element device (briefly referred to as a network element device ID), where CN is short for a common name of a certificate, and CNn: ESNn.XXX indicates a network element device ID; the third column of the table records an issuer of a certificate (briefly referred to as certificate issuer), and the fourth column of the table records a serial number of the certificate (briefly referred to as certificate serial number). An ID of a network element device, a certificate issuer, and a certificate serial number in each row of the list are corresponding to a network element identity in that row, and the OnlineCERT list may further include other information, which is not limited herein.

It may be understood that the format of the OnlineCERT list may further change as required. For example, the first column records an identifier of a network element device, the second column records a network element identity, the third column records a certificate serial number, and the fourth column records a certificate issuer, which may not be limited herein.

A format of the RevokeCERT list may be:

| Network element identity 1 | CN1: ESN1.XXX | Certificate issuer | Certificate serial number 1 |
|---|---|---|---|
| Network element identity 2 | CN2: ESN2.XXX | Certificate issuer | Certificate serial number 2 |
| ... | ... | ... | ... |
| Network element identity n | CNn: ESNn.XXX | Certificate issuer | Certificate serial number n |

In table 2, n>=2

The first column of the table records a network element identity, the second column of the table records an identifier (ID, identity) of a network element device, the third column of the table records an issuer of a certificate, and the fourth column of the table records a serial number of a certificate. An ID of a network element device, a certificate issuer, and a certificate serial number in each row of the list are corresponding to a network element identity in that row, and the RevokeCERT list may further include other information, which is not limited herein.

A format and a stored directory entry of the OnlineCERT list may correspond to a format and a stored directory entry of the RevokeCERT list, that is, a certain correspondence exists between the OnlineCERT list and the RevokeCERT list, so that information in the OnlineCERT list may be moved into the RevokeCERT list.

The network management system receives a certificate message reported by the network element. The network element may not be limited to a base station, a security gateway, or a router, and the network management system may receive, through a management and maintenance channel, the certificate message reported by the network element.

Certificate information in the certificate message includes a network element identity, a network element device ID, an issuer (Issuer) of a certificate, a serial number of the certificate, and the like, and a format of the certificate message may be the format of the OnlineCERT list or the format of the RevokeCERT list.

The network management system generates a certificate revocation request file according to the certificate information in the RevokeCERT list.

The network management system may regularly generate a certificate revocation request file according to the certificate information in the second list, and the regular time interval may be set as required. The network management system may also generate a certificate revocation request file according to the certificate information in the second list in real time, for example, when it is determined that there is certificate information needing to be revoked in the second list, or in response to a request of another device, for example, in response to a request of a PKI system.

Alternatively, the network management system may save the first list to store the certificate information being used by the network element; when determining that the certificate information in the first list needs to be revoked, the network management system generates a revocation request file according to the certificate information and removes the certificate information from the first list. Specifically, when the network element device of the network element is changed, certificate information of a new network element replaces the certificate information of the network element in the first list; when the network element is discarded, the network management system deletes the certificate information of the network element from the first list and deletes information about the network element.

Specifically, when there is more than one certificate issuer in the certificate information, the network management system may generate a corresponding certificate revocation request file according to different issuers in the certificate information, where the different certificate issuers are issued by different certificate authorities (Certificate Authority, CA), and the CAs may be main physical entities implementing a function of the PKI system.

The network management system sends the certificate revocation request file to the public key infrastructure (PKI) system for certificate revocation.

The network management system may regularly send the certificate revocation request file to the PKI system, where the regular time interval may be set as required. The network management system may also send the certificate revocation request file to the PKI system in real time, for example, when it is determined that a new certificate revocation request file is generated, or in response to a request of another device, for example, in response to a request of the PKI.

When the network management system determines that the network element device is changed, the network management system determines that information in the OnlineCERT list needs to be updated, and the network management system transfers corresponding certificate information in the OnlineCERT list into the RevokeCERT list.

Figure 6A:
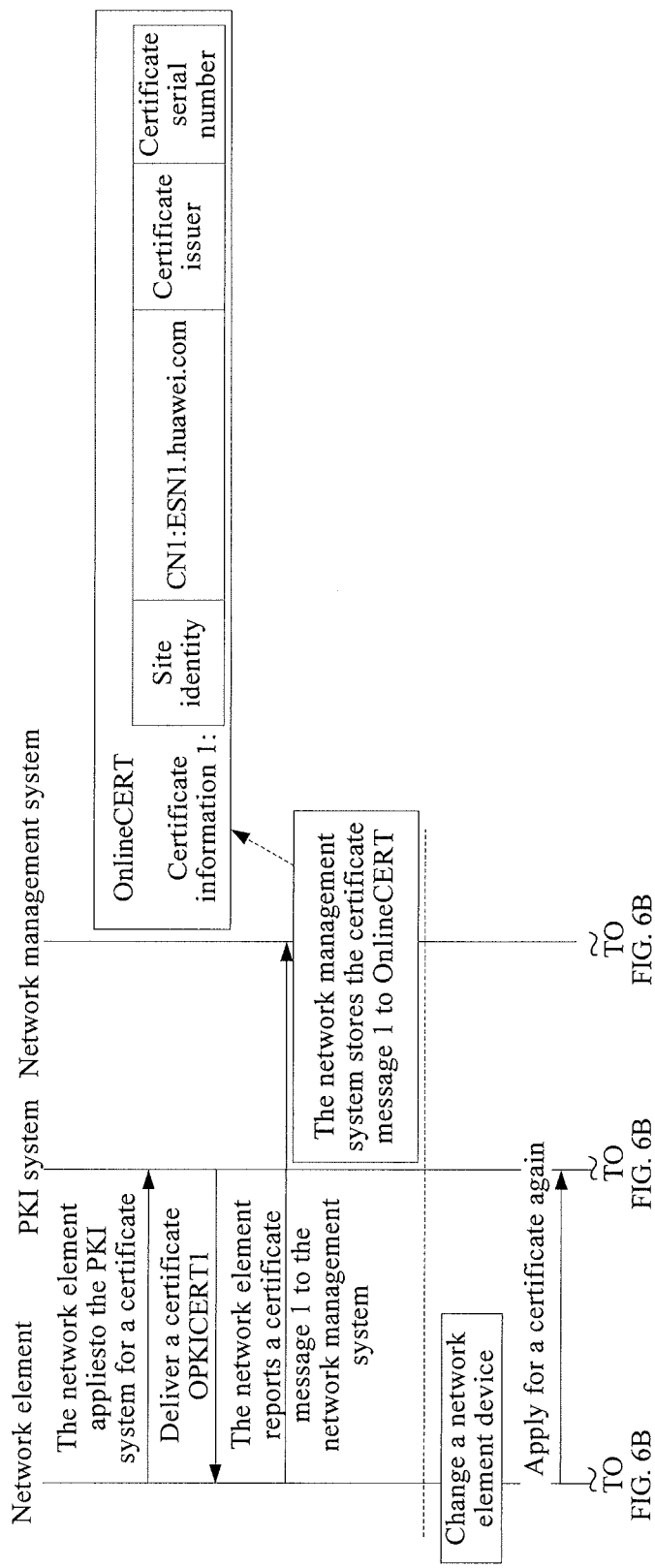
FIG. 6A and FIG. 6B are a schematic flowchart of a method for increasing network security according to an embodiment of the present invention.
Figure 6B:
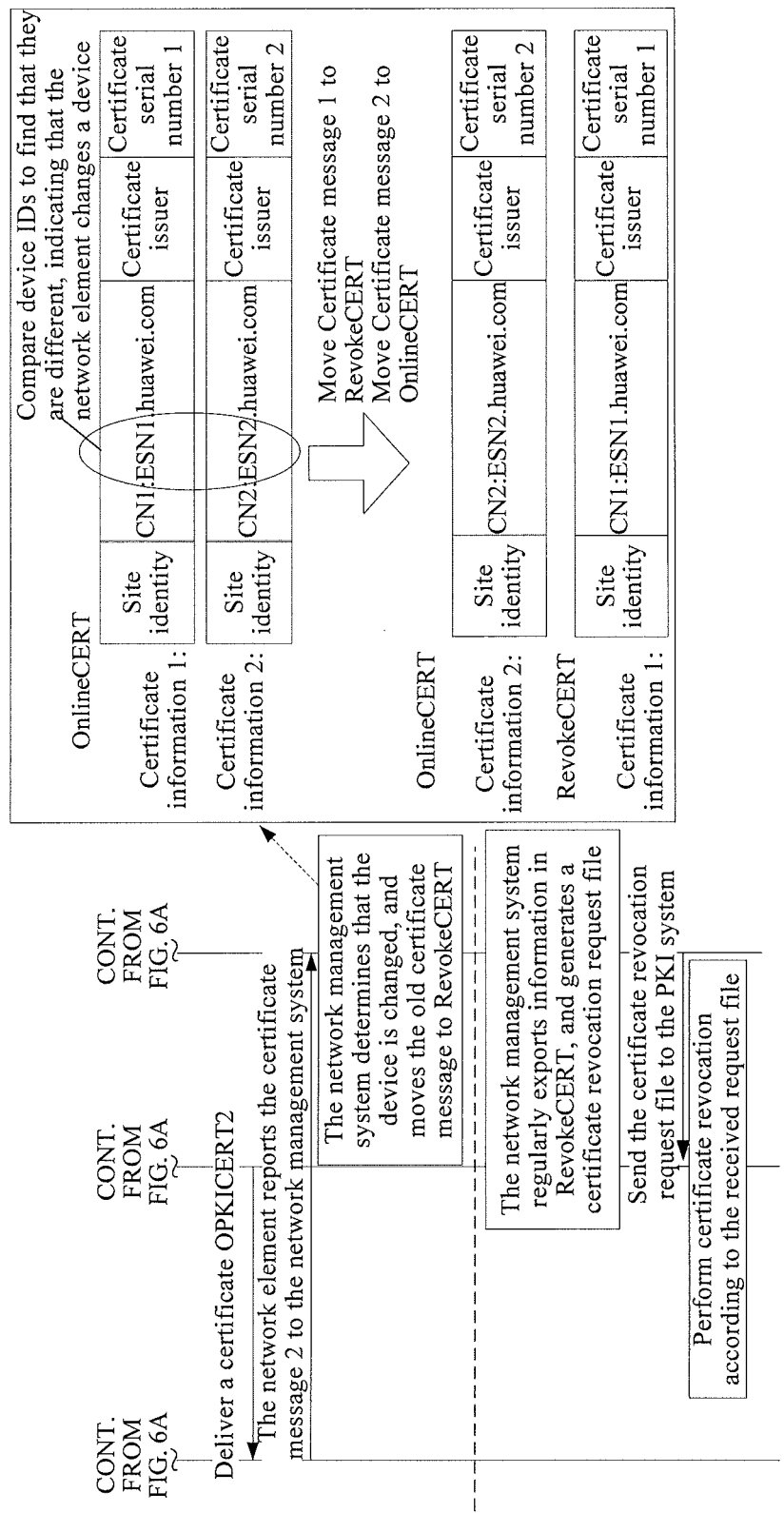

Specifically, if the network element device is changed, the following operations are performed: as shown in FIG. 6A and FIG. 6B, the network management system moves certificate information of the network element device stored in the OnlineCERT list into the RevokeCERT list, and moves the certificate information in the reported certificate message into the OnlineCERT list. That the network element device is changed may be determined in the following manner: an ID of the network element device in the certificate message reported by the network element is inconsistent with the network element device ID of the network element stored in the OnlineCERT list, that is, network element IDs are consistent but network element device IDs are inconsistent.

According to the foregoing method, a certificate corresponding to certificate information of a changed network element device is revoked by a PKI system, thereby avoiding illegal use of the certificate.

In another embodiment, a method for increasing network security when a network element is discarded is specifically provided. A first list and a second list are defined like the first list and the second list in the foregoing embodiment when a network element device is changed. For details, reference may be made to FIG. 7.

Figure 7:
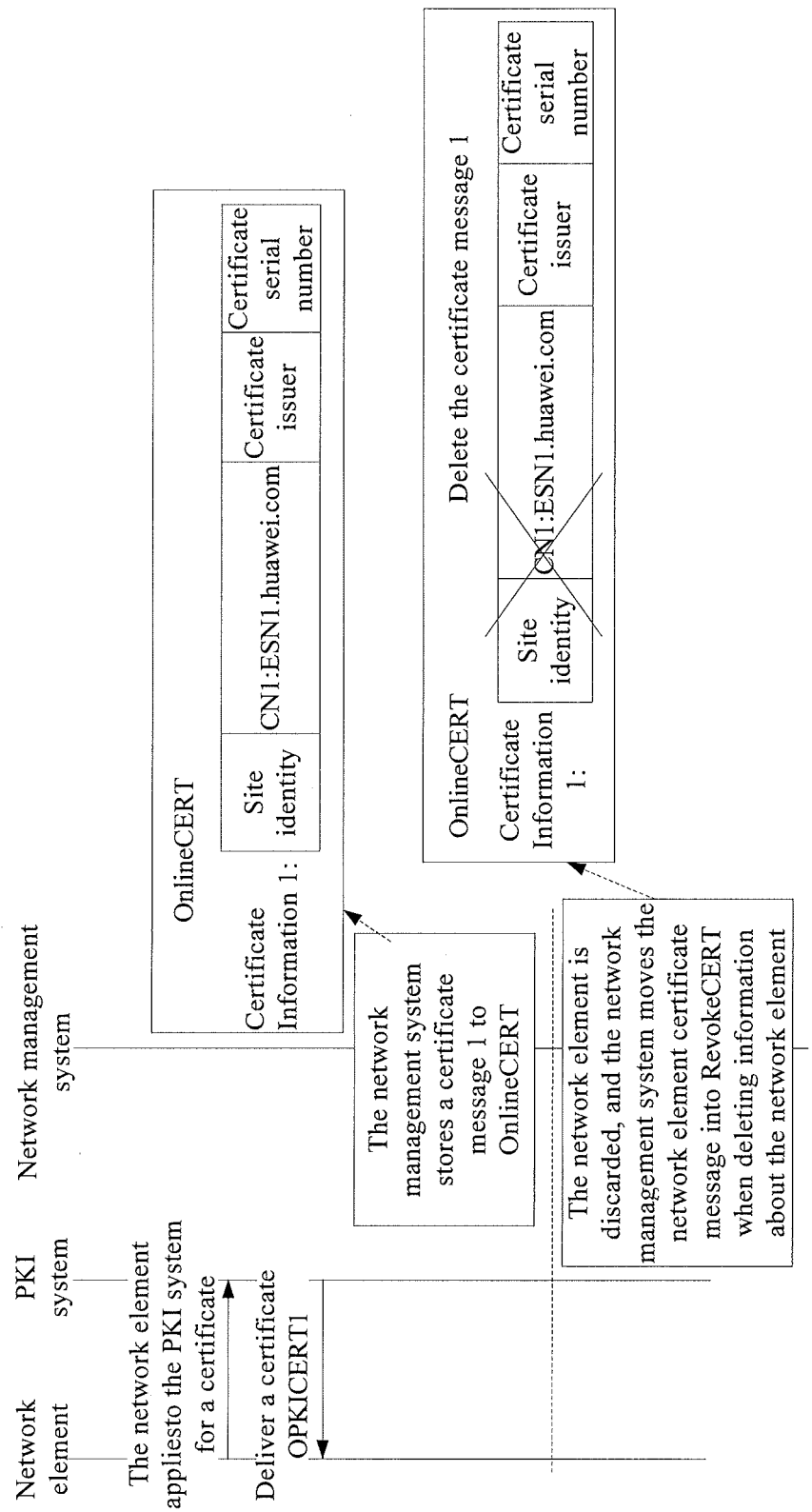
FIG. 7 is a schematic flowchart of a method for increasing network security according to an embodiment of the present invention.

If the network element is discarded, as shown in FIG. 7, a network management system moves certificate information of the network element in an OnlineCERT list into a RevokeCERT list, and deletes information about the network element.

According to the foregoing method, a certificate corresponding to certificate information of a discarded network element is revoked by a PKI system, thereby avoiding illegal use of the certificate.

In addition, in the foregoing embodiment, the network management system may further perform a corresponding update on the first list, so as to ensure accuracy of stored certificate information being used by the network element, and further ensure accuracy of certificate information needing to be revoked in the second list, thereby further improving network security.

The following is specifically included:

If a network element device is newly added, the network management system transfers certificate information in a certificate message reported by network element into the OnlineCERT list.

The network management system may determine that a network element device is newly added in the following manners: the network management system receives an ID of a network element device in the certificate message reported by the network element, but the ID of the network element device of the network element is not stored in the OnlineCERT list.

Figure 8A:
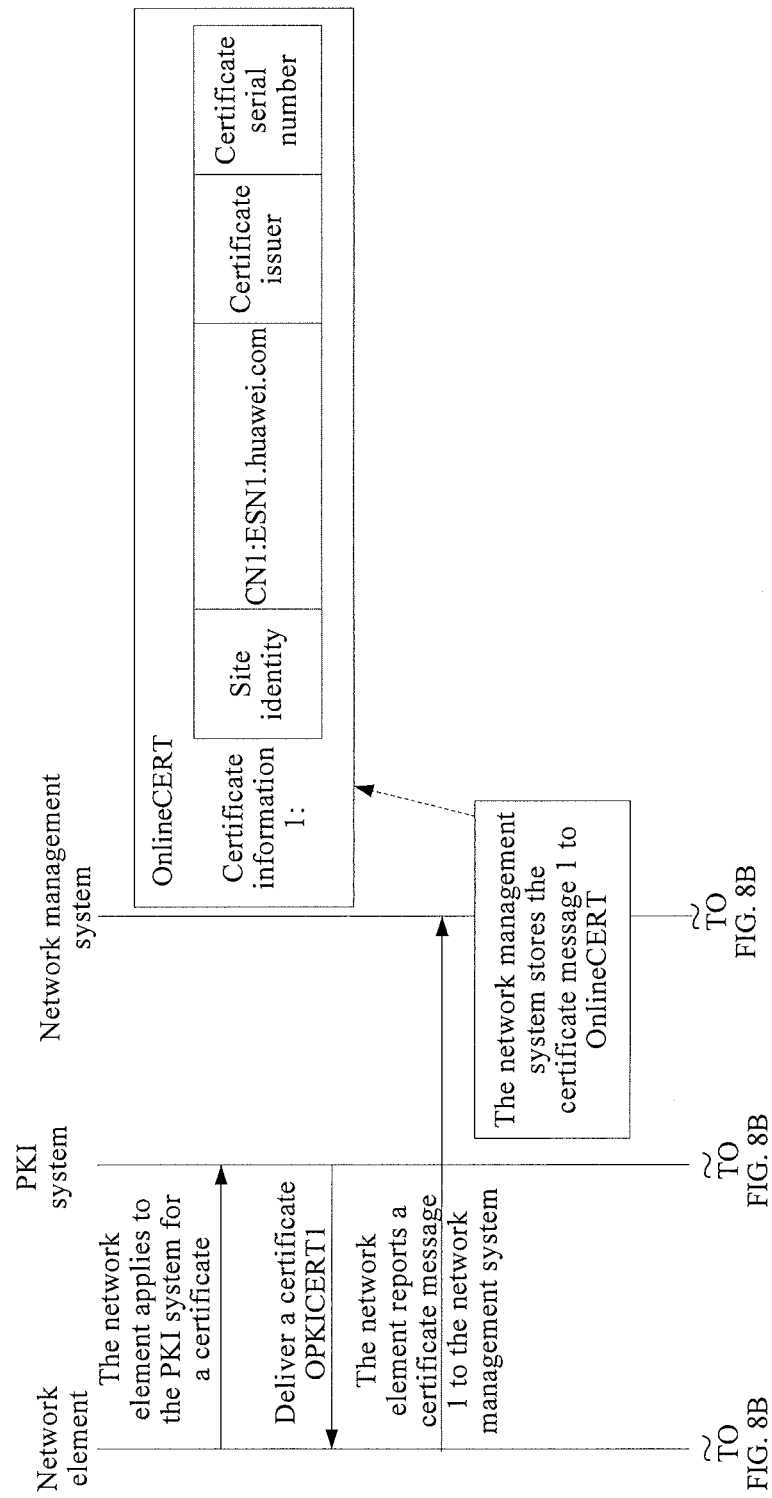
FIG. 8A and FIG. 8B are a schematic flowchart of a method for increasing network security according to an embodiment of the present invention.
Figure 8B:
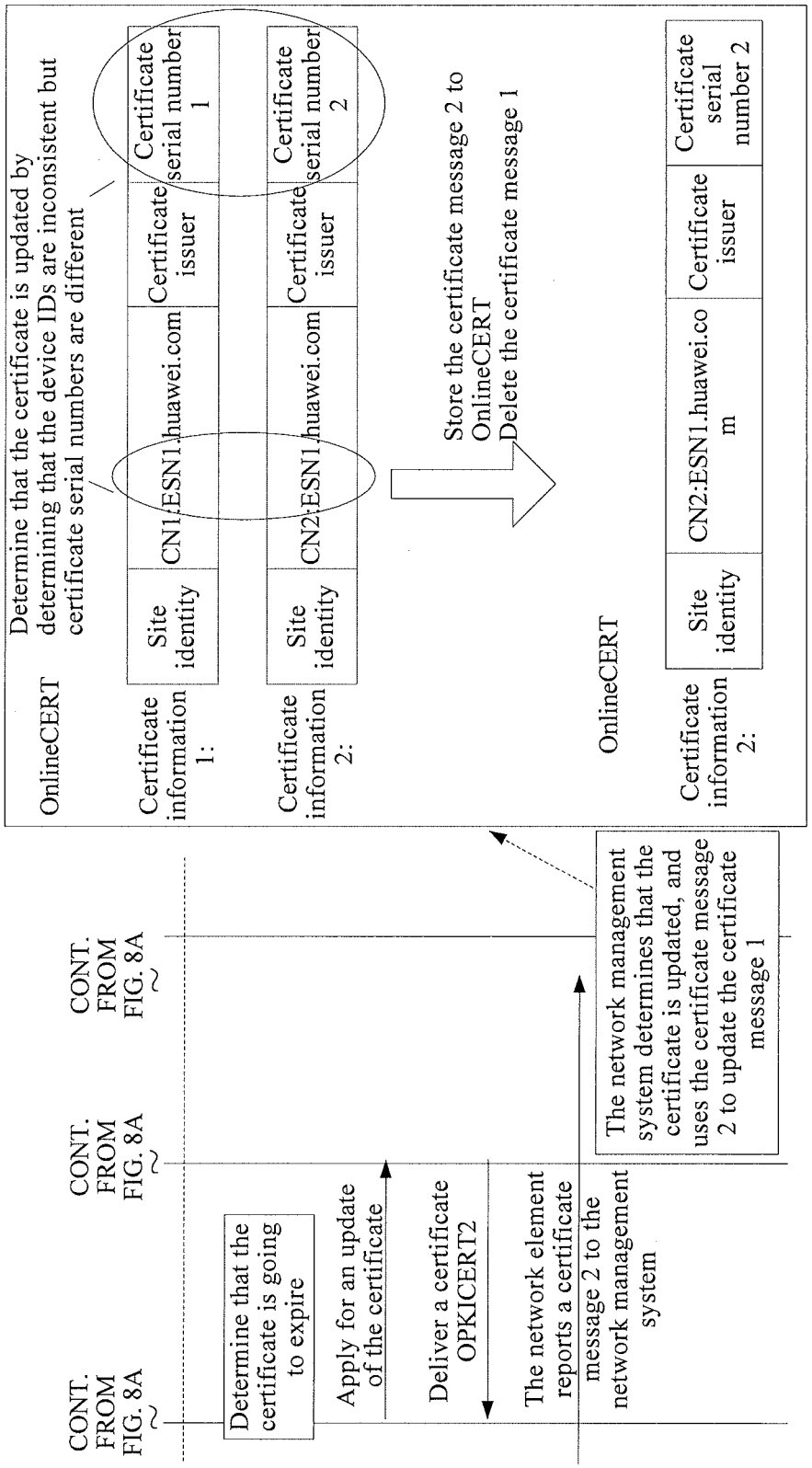

If the network element has a new certificate, as shown in FIG. 8A and FIG. 8B, the network management system moves the certificate information of the network element into the OnlineCERT list to overwrite the stored certificate information of the network element.

According to the method in this embodiment, a network management system may perform automatic revocation of a certificate for a network element device out of a network environment when the network element device is changed or the network element device is removed, thereby ensuring illegal use of the certificate. In one aspect, manual operation costs can be reduced and real-time performance can be increased, and in another aspect, an error risk brought by a manual operation can be avoided and network security can be increased.

Based on the descriptions of the foregoing implementation manners, a person skilled in the art may clearly understand that the present invention may be implemented by hardware, firmware, or a combination thereof. When software is used for implementation, the foregoing functions may be saved in a computer readable medium or serve as one or more instructions or codes on the computer readable medium for transmission. The computer readable media includes a computer storage medium and a communication medium, where the communication medium includes any medium that facilitates transferring of a computer program from one place to another place. The storage medium may be any available medium that can be accessed by a computer. The following is used as an example but not for limitation: the computer readable medium may include a RAM, a ROM, an EEPROM, a CD-ROM or other optical disk storage, a magnetic disk storage medium or other magnetic storage device, or any other medium that can be used to carry or save expected program code having an instruction or being in a data structure form, and can be accessed by the computer. In addition, any connection may properly function as a computer readable medium. For example, if the software is transmitted by using a coaxial cable, an optical fiber cable, a twisted pair, a digital subscriber line (DSL), or a radio technology such as infrared, radio, and microwave, from a website, a server, or other remote sources, the coaxial cable, the optical fiber cable, the twisted pair, the DSL, or the radio technology such as infrared, radio, and microwave are included in the fixed shadow of the medium. As used in the present invention, a disk (Disk) and a disc (disc) include a compact disc (CD), a laser disc, an optical disc, a digital versatile disc (DVD), a floppy disk and a Blue-ray disc, where the disk magnetically copies data in general while the disc optically copies data by using laser. The foregoing combination shall also fall within the protection scope of the computer readable medium.

The foregoing discloses only several specific embodiments of the present invention, and it is obvious that a person skilled in the art can make various modifications and variations to the present invention without departing from the scope of the present invention. In this way, if these modifications and variations to the present invention belong to the technical scope of the claims of the present invention and equivalent technologies, the present invention is also intended to include these modifications and variations.

What is claimed is:

1. A method for increasing network security, wherein the method comprises:
    saving, by a network management system, a first list, wherein the first list is used to store certificate information being used by a network element, and the first list comprises a network element identity (ID), a network element device ID, an issuer of a certificate, and a serial number of the certificate;
    when determining that a certificate corresponding to the certificate information in the first list needs to be revoked, generating, by the network management system, a certificate revocation request file according to the certificate information, and deleting the certificate information in the first list from the first list, wherein the certificate revocation request file is used to request revocation of the certificate needing to be revoked; and
    sending, by the network management system, the certificate revocation request file to a public key infrastructure (PKI) system; and
    wherein that the network management system determines that the certificate corresponding to the certificate information in the first list needs to be revoked further includes: determining, by determining that a managed network element device is changed or the network element is discarded, that the certificate information in the first list needs to be revoked.

2. The method according to claim 1, wherein the when determining that a certificate corresponding to the certificate information in the first list needs to be revoked, generating, by the network management system, a certificate revocation request file according to the certificate information comprises:
    saving, by the network management system, a second list, wherein the second list is used to store certificate information needing to be revoked; when determining that the certificate corresponding to the certificate information in the first list needs to be revoked, transferring, by the network management system, the certificate message into the second list, and generating, by the network management system, the certificate revocation request file according to the certificate information in the second list.

3. The method according to claim 1, further comprising:
    receiving, by the network management system, a certificate message reported by a managed network element, wherein the certificate message comprises certificate information, and the certificate information comprises a network element ID of the network element, a network element device ID, an issuer of a certificate, and a serial number of the certificate; and
    determining, by the network management system by determining that the network element device ID in the received certificate message of a network element device of the network element is inconsistent with the network element device ID of the network element stored in the first list, that the network element device of the network element reporting the certificate message is changed.

4. The method according to claim 3, further comprising: moving the certificate information in the reported certificate message into the first list.

5. The method according to claim 1, further comprising: receiving, by the network management system, a certificate message reported by a managed network element, wherein the certificate message comprises certificate information, and the certificate information comprises a network element ID of the network element, an ID of a network element device in the network element, an issuer of a certificate, and a serial number of the certificate; and
    updating, by the network management system, the first list according to the certificate information in the received certificate message and the certificate information in the first list.

6. The method according to claim 5, wherein the updating, by the network management system, the first list according to the certificate information in the received certificate message and the certificate information in the first list comprises:
    when determining that the ID of the network element device of the network element reported by the network element is not in the first list, moving, by the network management system, the certificate information in the received certificate message reported by the network element device of the managed network element into the first list.

7. The method according to claim 5, wherein the updating, by the network management system, the first list according to the certificate information in the received certificate message and the certificate information in the first list comprises:
    when determining that the ID of the network element device in the received certificate message of the network element device of the network element is consistent with the ID of the network element device of the network element stored in the first list but serial numbers are inconsistent, updating, by the network management system, the serial number in the certificate information of the network element device of the network element in the first list.

8. The method according to claim 1, wherein the generating, by the network management system, a certificate revocation request file according to the certificate information comprises:
    generating, by the network management system, a corresponding certificate revocation request file for different certificate authorities (CA) according to the certificate information corresponding to the certificate needing to be revoked.

9. The method according to claim 8, wherein certificates issued by the different CAs are indicated by issuers of certificates in the certificate information.

10. An apparatus for increasing network security, comprising:
a storage, a processor, and a sender, wherein:
the storage is configured to save a first list, wherein the first list is used to store certificate information being used by a network element, and the certificated information in the first list comprises a network element identity (ID), a network element device ID, an issuer of a certificate, and a serial number of the certificate;
the processor is configured to, when determining that a certificate corresponding to the certificate information in the first list needs to be revoked, generate a certificate revocation request file according to the certificate information, and remove the certificate information in the first list from the first list, wherein the certificate revocation request file is used to request revocation of the certificate needing to be revoked; and
the sender is configured to send the certificate revocation request file generated by the processor to a public key infrastructure (PKI) system; and
wherein the processor is further configured to determine, by determining that a network element device of a managed network element is changed or the network element device is discarded, that the certificate information in the first list needs to be revoked.

11. The apparatus according to claim 10, wherein the processor is configured to, when determining that a certificate corresponding to the certificate information in the first list needs to be revoked, generate a certificate revocation request file according to the certificate information, and remove the certificate information in the first list from the first list comprises:
the processor configured to save a second list, wherein the second list is used to store certification information needing to be revoked; and the processor is further configured to, when determining that the certificate corresponding to the certificate information in the first list needs to be revoked, transfer the certificate information into the second list, and generate the certificate revocation request file according to the certificate information in the second list, wherein the certificate revocation request file is used to request revocation of a certificate corresponding to the certificate information in the second list.

12. The apparatus according to claim 10, wherein the apparatus further comprises a receiver, configured to receive a certificate message reported by the managed network element, wherein the certificate message comprises certificate information, and the certificate information comprises a network element ID of the network element, an ID of a network element device in the network element, an issuer of a certificate of the network element, and a serial number of the certificate of the network element; and
the processor is configured to determine, by determining that the ID of the network element device in the received certificate message of the network element device of the network element is inconsistent with the network element device ID of the network element stored in the first list, that the network element device of the network element reporting the certificate message is changed.

13. The apparatus according to claim 12, wherein the processor is further configured to move the certificate information in the reported certificate message into the first list.

14. The apparatus according to claim 10, wherein the apparatus further comprises a receiver, configured to receive a certificate message reported by the network element device of the managed network element, wherein the certificate message comprises certificate information, and the certificate information comprises a network element ID of the network element, an ID of the network element device in the network element, an issuer of a certificate of the network element, and a serial number of the certificate of the network element; and
the processor is further configured to update the first list according to the certificate information in the received certificate message and the certificate information in the first list.

15. The apparatus according to claim 14, wherein the processor is configured to, when determining that the ID of the network element device of the network element reported by the network element is not in the first list, move the certificate information in the received certificate message reported by the network element device of the managed network element into the first list to update the first list.

16. The apparatus according to claim 14, wherein the processor is configured to update the serial number in the certificate information of the network element device of the network element in the first list to update the first list when determining that the ID of the network element device in the received certificate message of the network element device of the network element is consistent with the ID of the network element device of the network element stored in the first list but serial numbers are inconsistent.

17. The apparatus according to claim 10, wherein a certificate revocation request file is generated for certificates issued by different certificate authorities (Certificate Authority, CA).

* * * * *